Sept. 10, 1946.   R. D. COMPTON   2,407,403
TELEVISION CONTROL SYSTEM
Filed Aug. 12, 1942   2 Sheets-Sheet 1
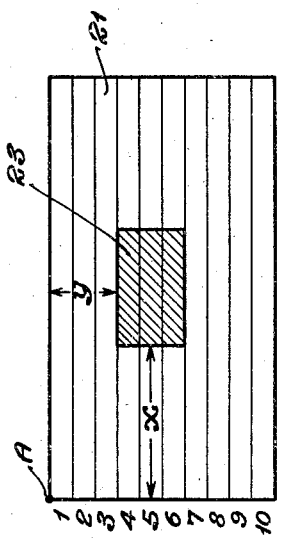
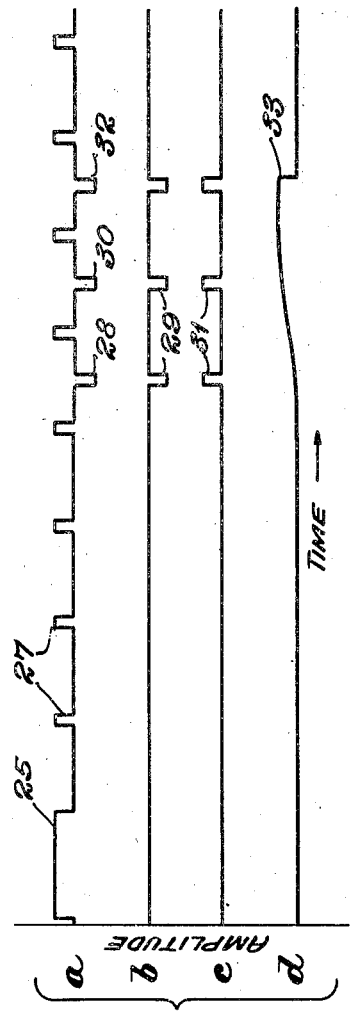
INVENTOR
Robin D. Compton
BY H. S. Grover,
ATTORNEY

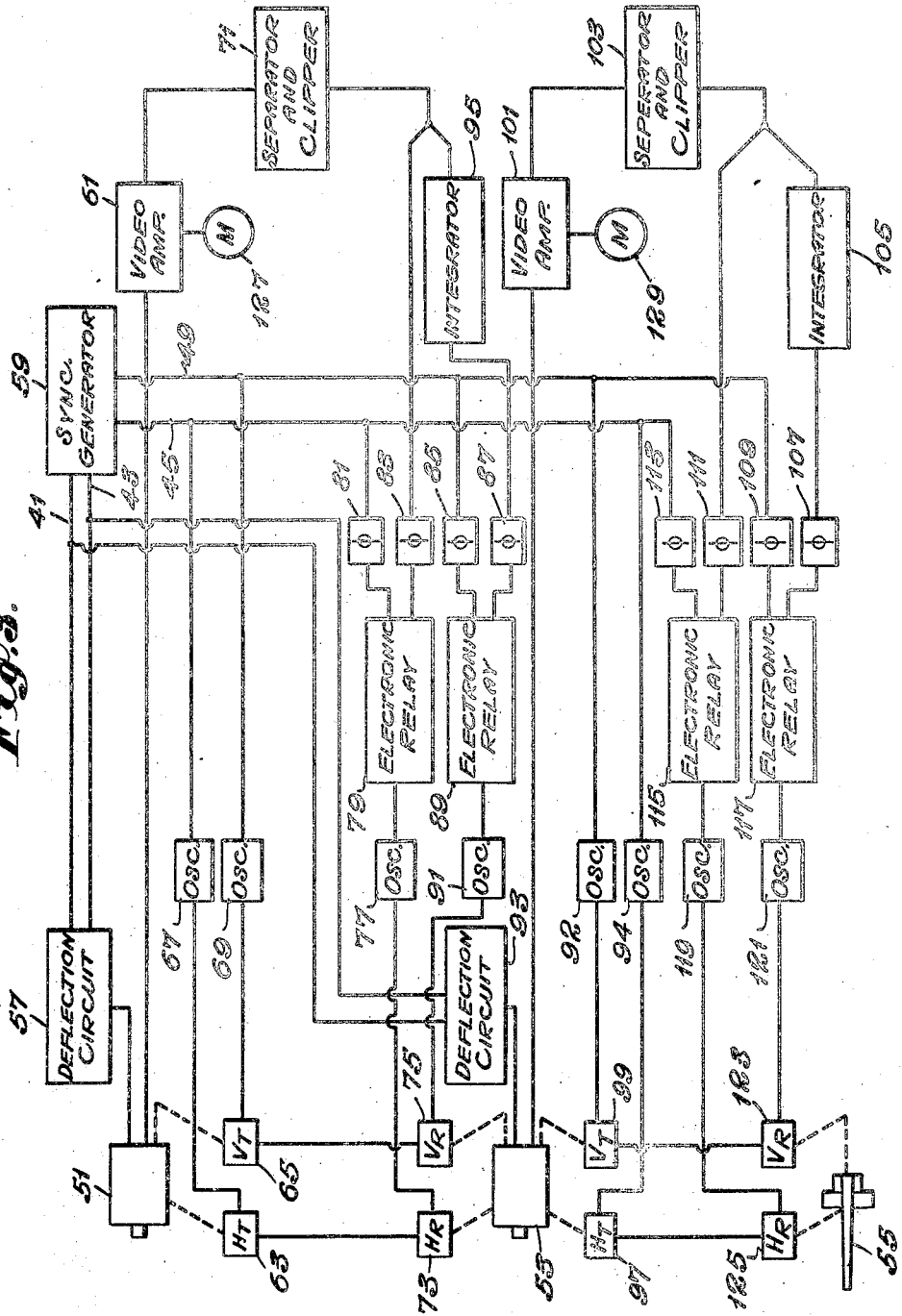

Patented Sept. 10, 1946

2,407,403

UNITED STATES PATENT OFFICE 2,407,403

TELEVISION CONTROL SYSTEM

Robin D. Compton, Westport, Conn., assignor to Radio Corporation of America, a corporation of Delaware Application August 12, 1942, Serial No. 454,529

6 Claims. (Cl. 172—239)

1

This invention relates to television control systems, and, more particularly, to control systems wherein television equipment is used to perform operations based upon visual observations, such as, for example, the control of anti-aircraft guns.

In many situations, it is necessary to make a visual observation of angles of elevation and azimuth to locate objects, and thereafter the observations are used to set equipment to bear upon the object on which the observations were made. One such case, for example, is anti-aircraft gun control, where the spotter reads off the angle of elevation and angle of azimuth, and the gun-pointer immediately trains the gun by elevating it and swinging it in accordance with the readings or observations given to him.

In dive bombing, for example, the time for bringing the gun to bear and firing is an extremely short interval, being only on the order of a few seconds. Human reaction time consumes a large percentage of the available time in which to fire the gun effectively to destroy the dive bomber. Moreover, this time lag between the stimulus and reaction becomes very important when corrections to the original observations must be applied.

My invention overcomes this delay, which in the past has been sometimes fatal. By my invention, I provide automatic control to the gun, which control has applied to it constantly a vernier correction so as to carefully and accurately track the flight of the plane.

In accordance with my invention, I use two television cameras, the first of which is preferably equipped with a normal focal length lens, and the second equipped with a longer focal length lens. Connecting the two cameras are Selsyn control motors, such that as the first camera is rotated and elevated, the second camera accurately and substantially instantaneously follows the course of the first camera so as to bear on the same field of view as the first camera.

The anti-aircraft gun is in turn actuated by Selsyn motor control between the second camera and the gun, so that the gun accurately follows the movement of the second camera.

The video signals from the first camera are utilized to provide a vernier correction of azimuth and elevation of the second camera, while the video signals produced by the second camera are utilized to provide vernier correction of the elevation and azimuth of the anti-aircraft gun.

It will thus be appreciated that the first

2 cameraman need only to bring the camera to bear on the field of view in which the plane is present, and thereafter the subsequent two vernier corrections will bring the gun to point directly at the plane.

The fact that the cameramen do not bring the plane exactly at the center of cross-hairs does not prevent accurate gunfire, that is to say, so long as the cameras are brought to bear so that the target is within the field of the cameras, the gun will bear directly at the center of the target.

Accordingly, the main object of my invention is to provide a new and novel control system utilizing television equipment.

Another object of my invention is to provide a television control system which accurately brings to bear equipment on a visual target, even though an operator merely makes an approximate setting.

A further object of my invention is to provide a method and means for automatically controlling the azimuth and elevation of guns.

Other objects of my invention will become apparent upon reading the detailed explanation and description below, in which reference will be made to the drawings.

In the drawings,

Figure 1 shows schematically a mosaic of a television transmitting tube with a schematic showing of an optical image on the mosaic;

Figures 2a to 2d are graphical representations of certain signal wave forms utilized in my invention; while Figure 3 shows in block diagram form the circuit arrangement utilized by my invention to control anti-aircraft guns, by way of example only.

In Figure 1, I have shown a mosaic of a television transmitting tube, such as an "Orthicon" or an "Iconoscope," and for simplicity, for descriptive purposes only, I have shown the mosaic as one which is scanned in ten lines, although in practice the number of scanned lines would be considerably greater than this, being on the order of 400 or more.

If an optical image is thrown upon the mosaic, then its angles of elevation and azimuth can be directly ascertained with respect to the camera position from the generated signals. For example, the mosaic 21 has thrown upon it an image 23, shown merely for purposes of explanation as a rectangle. As a result of the scanning process, the first three lines will be scanned without the production of any signal. However, the fourth, fifth and sixth lines scanning will produce a video signal. Thus, the object, being located three lines down from the top of the mosaic, will be located at an angle given by the proportion of 3 to 10, multiplied by the angle covered by the lens. This follows from the fact that the scanning of one field causes the beam to swing through the vertical angle subtended by the lens. Likewise, the distance "$x$" will determine the azimuth angle of the object since the distance between the left hand edge of the mosaic and the image is proportional to the time duration between the horizontal synchronizing impulse and the video signal produced by the scanned beam passing over the image.

Thus, the ratio between the time duration between the horizontal synchronizing or sync signal and the video signal to the duration of time required to scan one line, multiplied by the angle subtended the mosaic, will give the azimuth angle as measured from the left hand edge of the mosaic. Thus, the production of the video signal uniquely determines the position of the object with respect to the angle of elevation and the angle of azimuth relative to the camera bearing.

These video signals, in turn, can be utilized to produce a change in the phase of the actuating currents of Selsyn motors, which change in phase immediately causes the receiver (the Selsyn motor which is to follow the position of the transmitting Selsyn) to move to take a position such that the following or controlled apparatus bears directly and accurately upon the object being followed by the first camera.

The output of the second camera can be used similarly to control the gun.

In order to appreciate clearly the operation and method used, I have shown in Figure 3 a first camera 51, which is supplied with the appropriate deflection voltages, blanking signals, and so forth, from the synchronizing signal generator 59, usually referred to as the sync generator in accordance with standard television practice. The output of the camera 51 is amplified by the video amplifier 61, likewise in accordance with standard practice. A portion of the output energy of the video amplifier 61 is fed to the monitoring oscilloscope 127 so as to provide an operator with an image of the field picked up by the camera 51. A second portion of the output energy of the video amplifier 61 is fed to the separator and clipper 71. The separator serves to separate the video signals from the blanking and sync signals, and the clipper serves to convert the video signals, which may have varying amplitudes, to signals of constant amplitude, for the purpose which will be explained in detail below.

The sync generator 59 also serves to control oscillators 67 and 69, which supply the driving energy for the Selsyn motors 63 and 65, respectively. The two Selsyn motors 63 and 65, have their rotors coupled to the camera mechanisms which control the azimuth and elevation, respectively. In this way it will be observed that the control of the oscillator 67 related to the Selsyn transmitter 63, which represents a horizontal or a line motion of the camera 51, is derived under the influence of the line control sync pulses 27 (see Fig. 2) while control of the oscillator 69, which is related to the Selsyn transmitter 65 representing the elevational control, is provided by sync pulses such as those represented at 25 (see Fig. 2) identifying either the field or the frame of deflection rate. Essentially the same control exists with regard to the oscillators 77, 92 and 119 related to Selsyn apparatus representative of line paths, and oscillators 91, 94 and 121, later to be described, related to field paths, when these units are controlled from the sync generator 59 directly or through units such as those shown at 81 and 113 for line control and 85 and 109 for field control. Where reference is herein made to line and field, it shall be understood as coordinated with the reference to azimuth and elevation respectively.

The sync generator 59 also supplies energy to the phase shifters 81 and 85, the output of which phase shifters is then fed to electronic relays 79 and 89, respectively. The electronic relays, in turn, supply energy to the oscillators 77 and 91 to control their frequency and phase. The receiving Selsyns 73 and 75, therefore, are actuated by energy from the oscillators 77 and 91.

In the absence of any generated signals from the video amplifier 61, the electronic relays 79 and 89 are operative to supply energy from the sync generator 59, so that the receiving Selsyns 73 and 75 receive energy of the same frequency as that of the oscillators 67 and 69, respectively. Consequently, the transmitting Selsyns 63 and 65 and the receiving Selsyns 73 and 75 are, for all intents and purposes, connected to the same supply, so that the receiving Selsyns act as position indicators, i. e., assume the same phase position as the phase position of the transmitting Selsyns.

To insure that the second camera 53 bears on the center of the object, the phase shifters 81 and 85 are provided so that the operator, by varying these phase shifters, may introduce a change in position of the camera 53 independently of the position of the camera 51. The phase shifters 81 and 85 are provided to expedite the initial adjustments.

If the camera 51 is trained on an object so as to provide output from the video amplifier 61, then, following the separation and clipping action, the video signals are fed through phase shifters 83 and 87 to the electronic relays 79 and 89, respectively, the signal fed to the phase shifter 87 passing through an integrator 95.

The presence of clipped video signal energy immediately causes the electronic relays to remove, or open-circuit the connection from the phase shifters 81 and 85, with the result that the oscillators 77 and 91 are now controlled by the energy passing through the phase shifters 83 and 87 respectively. Since the video signals will, in general, have a different phase relation than the signals from the sync generator 59, the phase position of the oscillators 77 and 91 will immediately change, which in turn will produce a change in phase in the energy supplied to the receiving Selsyns.

The change in phase angle between the energy supplied to the receiving Selsyns and the energy supplied to the transmitting Selsyns immediately causes the receiving Selsyn rotors to change their position to restore the phase angle between the receiving and transmitting Selsyns to its original value, and consequently the camera 53 will have its elevation and azimuth changed in accordance with the video signals.

The phase shifters 83 and 87 are provided so that the operator may supply further correction, if necessary, to the position of the camera 53 so that the image occurring in the monitor 129 exactly coincides with cross-hair indicia placed on the screen face of the cathode ray monitoring tube.

Referring to Figure 2a, I have shown the composite signal fed to and from the video amplifier 61. The vertical sync signal 25 is followed by a series of horizontal sync pulses 27, and it will be noted, referring to the example of Figure 1, that there are four horizontal sync pulses followed by a video signal 28 of reverse polarity, as is conventional in television transmitting tubes. This video signal, in turn, is followed by the line or horizontal sync pulse for line 5, which in turn is followed by the video signal 30, produced when the beam scans across the image 23. The video signal 30, in turn, is followed by the horizontal sync signal for line 6, which in turn is followed by the video signal 32.

The separator circuit serves to remove the sync signals so as to produce the wave form shown in Figure 2b, in which only the video signals 29 remain. The clipper serves to invert the polarity and at the same time to limit the signals to a substantially constant amplitude, as shown in Figure 2c, where the signals 31 are now shown upright.

For purposes of controlling the oscillators which control elevation, part of the clipped energy which has the form shown in Figure 2c is integrated, by any of the integrating circuits well known in the art, at the integrator 95 to produce a signal having the shape somewhat as indicated at 33 in Figure 2d. This provides a signal through the phase shifter 87, and the electronic relay 89 to the oscillator 91 to control its phase and frequency.

It will be appreciated that the oscillator 91, which controls the elevation Selsyn receiver, has a frequency which is equal to that of the vertical scanning frequency, and consequently requires but one pulse per field. The frequency is identical with that of the vertical frequency of the synchronizing signal generator 59, since the pulses 33 of Figure 2d are produced at a rate determined by the vertical scanning of the mosaic of the camera 51.

When the integrated pulse 33 of Figure 2d passes through the electronic relay 89, the relay open-circuits the vertical pulse energy fed to the phase shifter 85, and the electronic relay, so that the oscillator 91 is controlled by the energy passing through the phase shifter 87. The phase shifter 87 similarly to the phase shifter 83, is under the control of the operator, and serves to center the image appearing at the monitoring position 129.

It will be very evident that the camera 53 thus follows the motion of the camera 51 whenever the camera 51 is moved by the operator handling it. Such movements can be considered as the main movements, but it will further be noted that the signals, after being separated and clipped at 71, provide correction impulses by shifting the phase of the oscillators 77 and 91 to provide a further correction to the Selsyn receivers so that the camera 53 is accurately brought to bear on the object of which an image appears, both at the monitoring positions 127 and 129. Since the monitors are equipped with cross-hairs, it will be noted that the operator sitting before the monitor, which may be located at a distance remote from the camera, can apply manual corrections through the phase shifters 81, 83, 85 and 87. These phase shifters in themselves provide a kind of vernier adjustment, and the final vernier corrections to the camera 53 are provided by the clipped video signal coming from the camera 51.

The camera 53, now having been brought accurately to bear on the object or target, likewise produces a video signal which is amplified at the video amplifier 101. This signal is similarly separated and clipped at 103. A portion of the clipped signal is fed directly to the phase shifter 111 through an electronic relay 115, thence to an oscillator 119 which serves to feed energy to the receiving Selsyn 125 of the same frequency as that fed to the transmitting azimuth Selsyn 97. Another portion of the clipped energy is fed through the integrator 105 to provide the control impulse for the elevation Selsyn motor, after passing through the phase shifter 107, the electronic relay 117 to the oscillator 121.

The action of the clipped energy and the electronic relays 115 and 117 is identical with that described above in discussing the electronic relays 79 and 89. Similarly, the phase shifters 107, 109, 111 and 113 serve the same purpose for the control of the gun 55 as described above for the control of the camera 53, so that final vernier corrections are provided by the clipped video signal from the camera 53.

The Selsyn transmitters 97 and 99, which again are coupled to the camera 53, are fed with suitable energy from the synchronizing generator 59, as shown. Consequently, the gun 55 follows the camera 53 precisely, and accurately comes to bear on the object or target because of the further correction impulses derived from the clipped video signal.

It will thus be observed that the final result is such that although the camera 51 is only brought to bear approximately on the target, that is, the target is within the field of the camera 51, without loss of time the gun 55 is brought to bear accurately on the target. Thus, my invention eliminates the reaction time of the camera operators, and so insures greater probability of destroying the target, than would be afforded without my invention.

By way of example, in order to appreciate completely the merits of my vernier correction control system, assume that the camera is equipped with a ten inch lens. Further assume that a plane is travelling at 300 miles per hour from right to left, which would give the shortest time that the image of the plane would remain on the mosaic. If the plane were 2000 feet away from the camera, and a standard iconoscope mosaic is used, then since the plane flight is 440 feet per second, the image will remain on the mosaic for approximately 2.2 seconds. If the standard 60 cycle television system is used, approximately 130 complete pictures will be transmitted without moving the camera, so that a like number of correction impulses for correcting the position of the gun will be transmitted, that is to say, both the azimuth and elevation information would be corrected sixty times a second with the accuracy of elevation determination being dependent upon the number of scanning lines, and the azimuth accuracy being dependent upon the horizontal definition of the system.

In the case of a dive bomber, of course, the bomber will be actually within the field of view a much longer time, and consequently there will be a longer time available to keep the gun on the target. With firing speeds of anti-aircraft guns on the order of several rounds per second, the gun would be able to fire at least between 15 and 20 rounds at the target.

Of course, it will be appreciated that corrections may be introduced by suitable manipulation of the phase shifters for leading the target, and to take into account wind velocity, barometric pressure and the other factors which must be accounted for and well known in the field of ballistics. These corrections can be suitably interposed by using a series of phase shifters which may be set preliminarily or even during the operation of the camera.

It is further to be noted that the elements which have been shown in the block diagram of Figure 3 may be standard ones which are all well known in the art. For example, the synchronizing signal (or sync) generator may be of the form shown and described in the textbook "Principles of Television Engineering" by Fink (McGraw, Hill, 1940) beginning at page 402, et seq. The video amplifiers may be any of the standard type well known in the art, such as described in the above referred-to textbook at chapter VI. The separator and clipper and the integrator may likewise take the form shown in the above referred-to textbook with one example of the separator-clipper being found on page 373 and a form of the integrator being shown by way of example on page 377. Accordingly, the clipper and separator may be regarded essentially as a limiter circuit and the integrator generally as a low pass filter.

Any of the phase shifters well known in the art, such as the inductive or electronic type, may be used. The electronic relay may be in the form of the cut-off relay shown at Figure 7 of the Goldsmith Patent 2,181,564, which issued November 28, 1939, in which however, it would be unnecessary to utilize an electro-magnetic relay, and in which the output terminals of the amplifiers 9 and 21 would be connected in parallel. The oscillators 67, 69, 79, 91, 119 and 121 may preferably be of the type shown in the Fink book above referred to at page 405, where frequency control is provided, although it is not important that the oscillator circuit be of this form.

It will be appreciated, of course, that the time constants of the frequency control circuit must be sufficient to hold for at least the time duration of one field, and yet immediately perform the correction upon the reception of an actuated impulse. These features are well known by those skilled in the art, such as is typified by the type of circuit shown at page 445 of the above referred-to textbook.

The Selsyn motors and the principles thereof are also well known, as described in page 16 of the textbook "Fractional Horsepower Electric Motors" by Veinott (McGraw, Hill, 1939).

In view of the fact that all of the circuit elements and components are well known, they are not described in detail. It will be appreciated that the description of the invention with respect to the control of an anti-aircraft gun is merely by way of example, and that the invention may be applied to training a telescope or theodolite, or in general, wherever it is desired to train a device upon either a moving or stationary object rapidly, accurately and with precise vernier control.

It is, of course, appreciated, as is well known in the art, that the Selsyn position indicators will be fed with a frequency much higher than 60 cycles, preferably on the order of 500 to 2000 cycles, since the higher the frequency, the more rapid the movement of the motor and the more precise the control. These features are of course well known, and recognized in the art of Selsyn motor drives. Too high a frequency, of course, usually results in requiring too much power, and consequently it has been found in practice that the optimum frequency lies in the range above indicated. Where it is necessary to supply considerable power much greater than that supplied by the Selsyn motors, then, of course, torque amplifiers may be used between the Selsyn motors and the gun positioning mechanism. Such mechanical amplifiers are well known in the art, and described in the "American Machinist" for May 26, 1927.

Having now described my invention, what I claim is:

1. A control system for aiming and directing a controlled device comprising a first and a second television camera each directed to receive optical images from a predetermined field of view toward at least a portion of which the said controlled device is adapted to be aimed, means to derive separate video signal outputs from each of the cameras, a standard signal generator to control the normal rate at which video signals are derived and to stabilize the operation of each of the cameras to a synchronous state, Selsyn drive means connected between the first and second television cameras, said drive means comprising a Selsyn transmitter and a Selsyn receiver for transferring control energy between the first camera and the second camera, said energy transfer being representative of motional shifts of the first camera from a predetermined normal position in both a vertical and a horizontal plane, means to supply energy to both of the said Selsyn means, separator and clipper means to derive control energy from the video signals of the first camera, relay means to control the Selsyn receiving means under the influence of the sync generator during periods of video signal interruption and from the video signals separated from the control signals during periods of video signal development whereby tracking of the second camera with the scene of action scanned by the first camera is effected, and a like system including a pair of Selsyn transmitters and receivers connected between the second camera and the controlled device, and means comprising a separate separator and clipper unit and relay means to effect a similar operation of the Selsyn receiver means associated with the controlled device which control is effected under the influence of the video signals developed by the second camera.

2. A control system for aiming and directing a controlled device toward an image area from which video signals are derived comprising a first and a second television camera each directed to receive optical images from a predetermined field of view, means to scan each of the camera tubes along a series of line paths repeating at a desired field rate to derive separate video signal outputs from each of the cameras, a sync signal generator to control the normal rate at which video signals are derived for each line and field, and to provide pulse signals to be mixed with the video outputs to stabilize the operation of remote cameras to a synchronous scanning rate, Selsyn drive means including transmitter and receiver elements connected between the first and second television cameras for transferring control energy between the first camera and the second camera which is representative of motion of the first camera in both line and field paths, oscillator energized from the sync generator means connected with the transmitter Selsyns to supply energy to both of the said Selsyn means, separator and clipper means to derive control energy from the video signals of the first camera, relay means to control the Selsyn receiving means under the influence of the sync generator during periods of video signal interruption and from the video signals as separated from the control signals during periods of video signal development whereby tracking of the second camera with the scene of action scanned by the first camera is effected, and a like system including a pair of Selsyn transmitters and receivers connected between the second camera and the controlled device, and means comprising separator and clipper units and relay means to effect a similar operation of the Selsyn receiver means associated with the controlled device so that a second degree control is effected thereupon under the influence of the video signals developed by the second camera.

3. A control system for aiming and directing a controlled device comprising a first and a second electronic television camera tube each adapted to be pointed to receive optical images from a predetermined field of view toward at least a portion of which the said controlled device is adapted to be aimed, means to separately scan the images on each camera tube to derive separate video signals from each, a sync signal generator to control the normal rate at which video signals are derived and to stabilize the operation of each of the cameras to a synchronous state, Selsyn drive means comprising a Selsyn transmitter and a Selsyn receiver connected between the first and second television cameras for transferring control energy between the first camera and the second camera, said energy transfer being representative of motion of the first camera in both a vertical and a horizontal plane and adapted to cause the second camera to follow the receiver Selsyn, means to supply energy to both of the said transmitter Selsyn means under the control of the sync generator frequency, separator and clipper means to derive control energy pulses from the video signals of the first camera which occur at times other than the sync pulses, relay means to control the Selsyn receiving means under the influence of the sync generator during periods of video signal interruption and from the video signals separated from the control signals during periods of video signal development whereby tracking of the second camera with the scene of action scanned by the first camera is effected in proportion to the phase shift between the instantly effective control pulse and the normal sync signal pulse, and a like system including a pair of Selsyn transmitters and receivers connected between the second camera and the controlled device, and means comprising additional separator and clipper units and relay means to effect a similar operation of the said second Selsyn receiver means associated with the controlled device so that the second control is effected under the influence of the video signals developed by the second camera.

4. A control system for aiming and directing a controlled device in a desired alignment relative to an object area comprising a first and a second television camera tube each having mosaic electrode elements to receive optical images representative of the object area toward which the said device is aimed, electron beam means to scan each mosaic separately along linear paths repeating at a desired field scanning rate and to derive separate video signals from each of the said camera tubes, a sync signal generator to control the normal rate at which video signals are derived and to provide control signals to stabilize and synthesize the operation of each of the cameras, a pair of Selsyn drive means connected between the first and second television cameras, said drive means comprising a pair of Selsyn transmitters associated with the first camera and a pair of Selsyn receivers associated with the second camera and connected with the said Selsyn transmitters individually so that a transfer of control energy takes place between the first camera and the second camera which is representative of a coordinate of motion of the first camera in both a vertical and a horizontal plane, means to supply energy to both of the said Selsyn transmitter and receiver means from the sync generator, separator and clipper means to derive control energy from the video signals of the first camera, relay means responsive to derived signals to control the Selsyn receiving means under the influence of the sync generator only during periods of video signal interruption and to switch the control to the video signals separated from the control signals during periods of video signal development whereby tracking of the second camera with the scene of action scanned by the first camera is effected in accordance with the delay of the effective control signals relative to the normal sync pulses, and a like system including a pair of Selsyn transmitters and receivers connected between the second camera and the controlled device, and means comprising an additional separator and clipper unit and relay means to effect a similar operation of the Selsyn receiver means associated with the controlled device which control is effected under the influence of the video signals developed by the second camera.

5. The system claimed in claim 4 comprising, in addition, a signal integrating unit connected between each separator and clipper and the relay means to provide the control signal for modifying the operation of one of each of the receiver Selsyn controls.

6. A system for causing a controlled element to move in bidirectional paths under the influence of developed video signals so that the controlled element aligns itself with a predetermined portion of the field of view from which the video signals are developed which comprises a first television camera having means associated therewith for directing an optical image representing a bidimensional field of view thereupon, means to derive video signals from the said camera by a bidirectionally scanning operation, a sync signal generator for developing sync signals of line and field scanning frequency for effecting scannings of the said bidirectional image, means to control each scanning operation from the said sync signal, a pair of Selsyn transmitters coupled to said camera and adapted to represent any positional changes of the path along which the image is directed toward the camera, a pair of oscillators for supplying energy to the said Selsyn transmitters and connections from the sync generator to supply to one of the oscillators field scanning sync pulses and line frequency sync pulses to the other oscillator so as to control the frequency of each of the said oscillators from the sync generator, a separator and a clipper circuit connected to receive from the camera both the video output signals representing the image projected upon the camera and intermingled sync signals representing the rates of line and field deflection, means for separating the video signals from the remaining signals, a second television camera positioned to receive at least a portion of the image representing the field of view toward which the first camera is directed, a pair of Selsyn receivers connected with the second camera and also connected to receive energy from the first named Selsyn transmitters so that the said second camera is caused to track with the first camera, oscillator means to supply energy to the said Selsyn receivers, electronic relay means to supply control pulse energy to the said oscillators normally from the sync signal generator and during periods of the production of video signals to supply the separated video signal energy pulses representing selected areas of the initial field of view to control the said oscillators under the influence of phase shifted energy to modify the normal tracking operation, means for scanning the field of view projected upon the second camera to produce a second train of video signals interspersed with like character sync signals from the sync generator, a second pair of Selsyn transmitters connected with the second camera and arranged to follow its angular positionings in bidirectionally spaced paths, oscillator means connected with the sync generator to supply energy to the second said Selsyn transmitters, a controlled unit and a pair of Selsyn receivers connected to receive energy from the last named Selsyn transmitters and to cause the controlled unit to track with the said second camera, a second sync separator and clipper to separate the second produced video signals from the control signals, oscillator means for energizing the second Selsyn receivers, and electronic relay means for controlling the last named oscillators from the sync generator during the absence of video signals and under the influence of the separating video signals during periods of video signal production whereby an effective phase shift is introduced to the oscillator to alter the position of the second named Selsyn receiver relative to the transmitter to produce the tracking action.

ROBIN D. COMPTON.